(12) United States Patent
Michels et al.

(10) Patent No.: US 6,169,157 B1
(45) Date of Patent: Jan. 2, 2001

(54) METHOD FOR PRODUCING SEMI-RIGID COMPACT OR CELLULAR SHAPED BODIES WITH A PUR BASE AND THE STABILIZATION THEREOF; SHAPED BODIES PRODUCED ACCORDING TO SAID METHOD AND THE USE THEREOF

(75) Inventors: Erhard Michels, Köln; Klaus Pleiss, Gladbach; Hans-Norbert Dick, Leverkusen, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/381,059
(22) PCT Filed: Mar. 5, 1998
(86) PCT No.: PCT/EP98/01245
  § 371 Date: Sep. 13, 1999
  § 102(e) Date: Sep. 13, 1999
(87) PCT Pub. No.: WO98/41575
  PCT Pub. Date: Sep. 24, 1998

(30) Foreign Application Priority Data

Mar. 17, 1997 (DE) ................................. 197 10 978

(51) Int. Cl.[7] .................................................. C08G 18/42
(52) U.S. Cl. ......................... 528/73; 524/752; 524/714; 524/875; 521/130
(58) Field of Search ........................ 528/73; 524/714, 524/752, 753

(56) References Cited

U.S. PATENT DOCUMENTS

| 3,193,525 | * | 7/1965 | Kallert et al. | 521/128 |
|---|---|---|---|---|
| 3,594,387 | | 7/1971 | Metzger | 548/234 |
| 3,770,693 | | 11/1973 | Metzger | 524/95 |
| 3,795,638 | | 3/1974 | Grögler | 524/213 |
| 4,997,971 | | 3/1991 | Maeda et al. | 560/4 |
| 5,130,360 | | 7/1992 | Ulrich | 524/195 |
| 5,210,170 | * | 5/1993 | Quiring et al. | 528/80 |
| 5,532,414 | | 7/1996 | Lehrich et al. | 564/252 |
| 5,621,138 | | 4/1997 | Lehrich et al. | 560/358 |
| 5,654,479 | | 8/1997 | Lehrich et al. | 564/252 |

FOREIGN PATENT DOCUMENTS 1113926  5/1968  (GB).

* cited by examiner

*Primary Examiner*—James J. Seidleck
*Assistant Examiner*—Melanie Bagwell
(74) *Attorney, Agent, or Firm*—Joseph C. Gil; N. Denise Brown

(57) ABSTRACT

This invention relates to a process for producing polyester-polyurethane compositions, and to the stabilization thereof in relation to hydrolytic ageing phenomena by an active ingredient combination comprising compounds containing carbodiimides with lactone derivatives, to mouldings produced therefrom and to the use thereof for semi-rigid, solid and/or cellular mouldings.

6 Claims, No Drawings

METHOD FOR PRODUCING SEMI-RIGID COMPACT OR CELLULAR SHAPED BODIES WITH A PUR BASE AND THE STABILIZATION THEREOF; SHAPED BODIES PRODUCED ACCORDING TO SAID METHOD AND THE USE THEREOF

This invention relates to a process for producing polyester-polyurethane compositions, and to the stabilisation thereof in relation to hydrolytic ageing phenomena by an active ingredient combination comprising compounds containing carbodiimides with lactone derivatives, to mouldings produced therefrom and to the use thereof for semi-rigid, solid and/or cellular mouldings.

Semi-rigid, elastic polyurethane mouldings of solid or cellular, i.e. slightly foamed, structure are often synthesised based on polyester-polyurethane compositions. The addition of carbodiimides has for a long time proved useful in order to improve the resistance of these materials in a moist environment, i.e. under conditions which cause hydrolysis (Kunststoff Handbuch, Volume VII, Polyurethanes, 1994 by Dr. G. Oertel, Carl-Hanser-Verlag, Munich), wherein other classes of substances, such as 2-phenylimino-oxazolidines or hydroxyethylureas for example, are also effective (FR-PS 1 450 919, U.S. Pat. No. 3,795,638).

This treatment of the material with carbodiimides is unsatisfactory, however, when manufacturing relatively soft mouldings with a hardness <90 Shore A, which in addition are synthesised so that chemically they are very linear and which possibly contain high activator/catalyst contents in order to speed up the polyurethane synthesis reaction. In this situation, for example, an increase in the proportion of carbodiimide, even above the customary and generally recommended content of about 2% by weight in the polyurethane composition, no longer results in the moulding having a lasting stability in relation to hydrolytic attack.

It has now been found that the stabilising effect of carbodiimides can be considerably increased when lactones are present simultaneously. Since lactones have no effect when used in the absence of carbodiimides, there is clearly a combination effect here. Furthermore, it is surprising that this active ingredient combination has a stabilising effect which is greater than that of a carbodiimide content alone, even if the latter content is increased many times.

The present invention therefore relates to a process for producing solid transparent, as well as cellular, foamed PUR mouldings by the polyisocyanate addition polymerisation method, with a hardness of 40 to 90 Shore A, by the reaction of a) organic and/or modified organic polyisocyanates with
b) at least one higher molecular weight compound containing at least two reactive hydrogens, and with
c) low molecular weight chain extenders and/or crosslinking agents in the presence of
d) catalysts and
e) the active ingredient mixture according to the invention, comprising carbodiimides and lactones, as well as
f) auxiliary agents and additives, characterised in that component e) is contained in the reaction mass with 0.50 to 20% by weight of a lactone or lactone mixture and with 0.2 to 4.0% by weight of a carbodiimide or carbodiimide mixture.

In detail, the following can be stated with regard to the mouldings produced according to the invention and their starting components a) to f):

a) Aliphatic, cycloaliphatic, araliphatic and preferably aromatic polyvalent isocyanates are suitable as the organic polyisocyanates (a). The following are particularly suitable: alkylene diisocyanates containing 4 to 12 carbon atoms in their alkylene radical, such as 1,12-dodecane diisocyanate, 2-ethyl-tetramethylene 1,4-diisocyanate, 2-methyl-pentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate, as well as any mixtures of these isomers; 1-isocyanato-3,3,5-trimethyl-5-isocyanatomethyl-cyclohexane (isophorone diisocyanate), 2,4- and 2,6-hexahydrotoluylene diisocyanate, as well as the corresponding mixtures of isomers, 4,4'-, 2,2'- and 2,4'-dicyclohexylmethane diisocyanate as well as the corresponding mixtures of isomers; araliphatic diisocyanates, such as 1,4-xylylene diisocyanate and mixtures of xylylene diisocyanate isomers, and preferably aromatic di- and polyisocyanates, such as toluene 2,4- and 2,6-diisocyanate and the corresponding mixtures of isomers; naphthalene 1,5-diisocyanate (NDI), 4,4'-, 2,4'- and 2,2'-diphenylmethane diisocyanate (MDI) and the corresponding mixtures of isomers, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI) and mixtures of crude MDI and toluene diisocyanates. The organic di- and polyisocyanates may be used singly or in the form of mixtures.

What are termed modified polyvalent isocyanates are also frequently used, i.e. products which are obtained by the chemical reaction of organic di- and/or polyisocyanates. Examples include di- and/or polyisocyanates containing ester, urea, biuret, allophanate, carbodiimide, isocyanurate, uretdione, uretonimine and/or urethane groups. Particular examples include the following: organic, preferably aromatic, polyisocyanates which contain urethane groups and which have NCO contents of 33.6 to 15% by weight, preferably 31 to 21% by weight, with respect to their total weight, for example 4,4'-diphenylmethane diisocyanate modified with low molecular weight diols, dialkylene glycols, trialkylene glycols or polyoxyalkylene glycols with molecular weights up to 6000, and mixtures of 4,4'- and 2,4'-diphenylmethane diisocyanates or toluene 2,4- or 2,6-diisocyanate, wherein the following are cited as examples of di- or polyoxyalkylene glycols which can be used singly or as mixtures: diethylene-, dipropylene-, polyoxyethylene-, polyoxypropylene- and polyoxypropylene-polyoxyethylene glycols. Compounds which are also suitable include prepolymers which contain NCO groups and which have NCO contents of 25 to 3.5% by weight, preferably 23 to 13% by weight, with respect to their total weight, which are produced from the polyether- and/or preferably polyester polyols described below and 4,4'-diphenylmethane diisocyanate, mixtures of 2,4'- and 4,4'-diphenylmethane diisocyanate, toluene 2,4- and/or 2,6-diisocyanates, as well as NDI or crude MDI. Liquid polyisocyanates which contain carbodiimide groups and/or isocyanurate rings and which have NCO contents of 33.6 to 15% by weight, preferably 31 to 21% by weight, with respect to their total weight, have also proved useful, e.g. those based on 4,4'-, 2,4'- and/or 2,2'-diphenylmethane diisocyanate and/or on toluene 2,4- and/or 2,6-diisocyanate.

These modified polyisocyanates may optionally be mixed with each other or with unmodified polyisocyanates, such as 2,4'-, or 4,4'-diphenylmethane diisocyanate, crude MDI, or toluene 2,4- and/or 2,6-diisocyanate. Examples of mixtures which are very suitable are those comprising diphenylmethane diisocyanates and/or toluene diisocyanates and/or crude MDI which are modified with urethane groups, and diphenylmethane diisocyanates and/or toluene diisocyanates and/or crude MDI which are optionally unmodified.

Organic polyisocyanates have proved particularly useful, and the following are therefore preferably employed for producing the polyurethane mouldings according to the invention: polyisocyanates containing aromatically bonded isocyanate groups and with an average NCO functionality of 2 to 3. Polyisocyanates which are particularly preferred comprise polyisocyanates or polyisocyanate mixtures of the diphenylmethane series which are liquid at room temperature, i.e. mixtures of 4,4'-diphenylmethane diisocyanate with 2,4'-diphenylmethane diisocyanates which are liquid at room temperature, carbodiimide- or uretonimine-modified derivatives of these isocyanates which are liquid at room temperature, and reaction products of these isocyanates with polyols, which products are liquid at room temperature. These semi-prepolymers are reaction products which have an NCO/OH equivalent ratio of 2.2:1 to 20:1.

b) The compounds which are used as higher molecular weight polyhydroxyl compounds (b) are advantageously those which have a functionality of 2 to 8 and an average molecular weight 400 to 12,000. Compounds which have proved particularly useful are polyols selected from the group comprising polyether polyols, polyester polyols, polythioether polyols, polyester amides containing hydroxyl groups, polyacetals containing hydroxyl groups, aliphatic polycarbonates containing hydroxyl groups and polymer-modified polyether polyols, or mixtures of at least two of said polyols. Polyester polyols and/or polyether polyols are employed in particular.

Suitable polyester polyols can be produced, for example, from organic dicarboxylic acids containing 2 to 12 carbon atoms, preferably from aliphatic dicarboxylic acids containing 4 to 6 carbon atoms, and polyhydric alcohols, preferably diols, containing 2 to 12 carbon atoms, preferably 2 to 6 carbon atoms. Examples of suitable dicarboxylic acids include: succinic acid, glutaric acid, adipic acid, suberic acid, azelaic acid, sebacic acid, decanedicarboxylic acid, maleic acid, fumaric acid, phthalic acid, isophthalic acid and terephthalic acid. In this respect, the dicarboxylic acids can be used either singly or in admixture with each other. Instead of the free dicarboxylic acids, the corresponding dicarboxylic acid derivatives can also be used, such as dicarboxylic acid mono- and/or diesters of alcohols containing 1 to 4 carbon atoms, or dicarboxylic anhydrides. Mixtures of dicarboxylic acids comprising succinic, glutaric and adipic acids in quantitative ratios of 20 to 35:35 to 50:50 to 32 parts by weight, for example, are preferably used, and adipic acid is used in particular. Examples of di- and polyhydric alcohols, particularly diols and alkylene glycols, include: ethanediol, diethylene glycol, 1,2- or 1,3-propanediol, dipropylene glycol, methyl-propanediol-1,3, 1,4-butanediol, 1,5-pentanediol, 1,6-hexanediol, neopentyl glycol, 1,10-decanediol, glycerol, trimethylolpropane and pentaerythritol. Ethanediol, diethylene glycol, 1,4-butanediol, 1,6-hexanediol, glycerol, trimethylolpropane or mixtures of at least two of said diols are preferably used, particularly mixtures of ethanediol, 1,5-butanediol and 1,6-hexanediol, glycerol and/or trimethylolpropane. Polyester polyols of lactones, e.g. ω-caprolactone, or hydroxycarboxylic acids, e.g. ω-hydroxycaproic acid, can also be used.

In order to produce the polyester polyols, the organic, e.g. aromatic and preferably aliphatic polycarboxylic acids and/or derivatives thereof and polyhydric alcohols are polycondensed in the melt, free from catalyst or preferably in the presence of esterification catalysts, advisedly in an atmosphere of inert gases, such as nitrogen, carbon monoxide, helium, argon, etc., for example, at temperatures of 150 to 200° C., preferably 180 to 220° C., optionally under reduced pressure, to give the desired acid number, which is advantageously less than 10 and is preferably less than 1.

According to one preferred embodiment, the esterification mixture is polycondensed under normal pressure at the aforementioned temperatures to give an acid number of 80 to 30, preferably 40 to 30, and is subsequently polycondensed under a pressure less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. Polycondensation can also be conducted in the liquid phase, however, in the presence of diluents and/or entraining agents, such as benzene, toluene, xylene or chlorobenzene for example, in order to remove water of condensation by azeotropic distillation.

In order to produce the polyester polyols, organic polycarboxylic acids and/or derivatives thereof and polyhydric alcohols are advantageously polycondensed in a molar ratio of 1:1 to 1.8, preferably 1:1.05 to 1.2.

The polyester polyols which are obtained preferably have a functionality of 2 to 3, particularly 2 to 2.6, and an average molecular weight of 600 to 6000, preferably 1000 to 4000.

Suitable polyether polyols are those which are produced by known methods, for example by anionic polymerisation, using alkali hydroxides such as sodium or potassium hydroxide, or alkali alcoholates such as sodium methylate, sodium or potassium ethylate or potassium isopropylate, as catalysts, and with the addition of at least one starter molecule which contains 2 to 8, preferably 2 or 3, bonded reactive hydrogen atoms, or by cationic polymerisation, using Lewis acids such as antimony pentachloride, boron fluoride etherate, etc., or bleaching earth as catalysts, from one or more alkylene oxides containing 2 to 4 carbon atoms in their alkylene radical.

Examples of suitable alkylene oxides include tetrahydrofuran, 1,3-propylene oxide, 1,2- or 2,3-butylene oxide, styrene oxide, and preferably ethylene oxide and 1,2-propylene oxide. The alkylene oxides can be used singly, alternately in succession or as mixtures. Examples of suitable starter molecules include: water, organic dicarboxylic acids such as succinic acid, adipic acid, phthalic acid and terephthalic acid for example, aliphatic and aromatic, optionally N-mono-, N,N- and N,N'-dialkyl-substituted diamines containing 1 to 4 carbon atoms in their alkyl radical, such as ethylenediamine, which may optionally be mono- and dialkyl-substituted, 1,3-propylenediamine, 1,3- or 1,4-butylenediamine, 1,2-, 1,3-, 1,4-, 1,5- and 1,6-hexamethylenediamine, phenylenediamine, toluene 2,3-, 2,4- and 2,6-diamine and 4,4'-, 2,4'- and 2,2'-diaminodiphenylmethane. The following are also suitable as starter molecules:

Alkanolamines such as ethanolamine, N-alkyl-alkanolamines, for example N-methyl- and N-ethyl-ethanolamine, dialkanolamines such as diethanolamine, N-alkyl-dialkanolamines, for example N-methyl- and N-ethyl-diethanolamine, and trialkanolamines such as triethanolamine for example, and ammonia. Polyhydric alcohols, particularly di- and/or trihydric alcohols, and/or dialkylene glycols are preferably used, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, or mixtures of at least two polyhydric alcohols and optionally water in addition.

The polyether polyols, preferably polyoxypropylene- and polyoxypropylenepolyoxyethylene polyols, advantageously have a functionality 2 to 8, average molecular weights of 800 to 12,000, preferably of 1000 to 6000, and advantageously have a content of alkali ions less than 10 ppm. Other suitable polyether polyols include polymer-modified polyether polyols, preferably graft polyether polyols, particularly those based on styrene and/or acrylonitrile, which are produced by the in situ polymerisation of acrylonitrile or styrene, or preferably of mixtures of styrene and acrylonitrile, e.g. in a ratio by weight of 90:10 to 10:90, preferably 70:30 to 30:70, advantageously in the aforementioned polyether polyols, analogously to the information in German Patent Specifications 11 11 394, 12 22 669 (U.S. Pat. Nos. 3,304,273, 3,383,351, 3,523,093), 11 52 536 (GB 10 40 452) and 11 52 537 (GB 987 618), as well as polyether polyol dispersions which contain the following, for example, as a disperse phase, usually in an amount of 1 to 50% by weight, preferably 2 to 25% by weight: inorganic fillers, polyureas, polyhydrazides, or polyurethanes and/or melamine containing bonded tert.-amino groups, and which are described, for example, in EP-A-0 1 1 752 (CA 1166 403), EP-B-01 1 752 (U.S. Pat. No. 4,304,708), U.S. Pat. No. 4,374,209 and DE-A3231497.

The polyether polyols can be used, just like the polyester polyols, singly or in the form of mixtures. Moreover, they can be mixed with polymer-modified polyether polyols or polyester polyols, as well as with polyester amides, polyacetals and/or polycarbonates which contain hydroxyl groups.

Examples of suitable polyacetals which contain hydroxyl groups include compounds which can be produced from glycols such as diethylene glycol, triethylene glycol, 4,4'-dihydroxyethoxy-diphenyl-dimethyl-methane, hexanediol and formaldehyde. Suitable polyacetals can also be produced by the polymerisation of cyclic acetals.

Examples of suitable polycarbonates which contain hydroxyl groups include those of the type known in the art, which can be produced by the reaction of diols such as 1,3-propanediol, 1,4-butanediol and/or 1,6-hexanediol, diethylene glycol, trioxyethylene glycol or tetraoxyethylene glycol with diaryl carbonates, e.g. diphenyl carbonate, or phosgene, for example.

Examples of polyester amides which contain hydroxyl groups comprise the predominantly linear condensates which are obtained from polybasic, saturated and/or unsaturated carboxylic acids or anhydrides thereof and polyhydric, saturated and/or unsaturated amino alcohols or mixtures of polyhydric alcohols and amino alcohols and/or polyamines.

c) The polyurethane-based mouldings can be produced with or without the use in conjunction of chain extenders and/or crosslinking agents (c). However, the addition of chain extenders, crosslinking agents or optionally even mixtures thereof may prove to be advantageous in order to modify the mechanical properties, e.g. the hardness. Examples of chain extenders and/or crosslinking agents which can be used include low molecular weight polyhydric alcohols, preferably diols and/or triols, with average molecular weights less than 480, preferably of 60 to 300. Specific examples comprise water, aliphatic, cycloaliphatic and/or araliphatic diols containing 2 to 14, preferably 2 to 6 carbon atoms, such as 1,3-propanediol, methyl-1,3-propanediol, 1,10-decanediol, o-, m- or p-dihydroxy-cyclohexane, diethylene glycol, triethylene glycol, dipropylene glycol, tripropylene glycol, bis-(2-hydroxyethyl)-bisphenol A and bis-(2-hydroxyethyl)-hydro-quinone, and preferably ethanediol, 1,4-butanediol, 1,6-hexanediol, triols such as 1,2,4-, or 1,3,5-trihydroxy-cyclohexane, trimethylolethane, glycerol, trimethylolpropane and triethanolamine, as well as polyalkylene oxides containing hydroxyl groups, e.g. those with average molecular weights up to 2500, preferably 130 to 850, and which are based on ethylene- and/or 1,2-propylene oxide, and the starter molecules mentioned above in connection with the production of polyether polyols.

Substances which are also suitable as chain extenders include N,N'-dialkyl-substituted, aromatic diamines, the aromatic radical of which may optionally be substituted by alkyl groups, and which contain 1 to 20, preferably 1 to 4 carbon atoms in their N-alkyl radical, such as N,N'-diethyl-, N,N'-di-sec.-pentyl-, N,N'-di-sec.-hexyl-, N,N'-di-sec.-decyl- and N,N'-dicyclohexyl-, p- or m-phenylenediamine, or N,N'-dimethyl-, N,N'-diethyl-, N,N'-diisopropyl-, N,N'-di-sec.-butyl- and N,N'-dicyclohexyl-4,4'-diaminodiphenylmethane and N,N'-di-sec.-butylbenzidine, for example.

If compounds of component (c) are used in conjunction, they can be employed in the form of mixtures or singly, advantageously in amounts of 1 to 30 parts by weight, preferably 1.5 to 14 parts by weight, with respect to 100 parts by weight of higher molecular weight compound (b).

d) Compounds which are used in particular as catalysts (d) for producing the semi-rigid, solid or cellular mouldings are those which considerably speed up the reaction of compounds of component (b) and optionally (c), which contain hydroxyl groups, with the organic, optionally modified polyisocyanates (a). Strongly basic amines are suitable. Examples include amidines such as 2,3-dimethyl-3,4,5,6-tetrahydro-pyrimidine or diazabicycloundecane, tertiary amines such as triethylamine, tributylamine, dimethyl-benzylamine, N-methyl- or N-ethylmorpholine, N,N,N',N'-tetramethyl-ethylenediamine, pentamethyldiethylenetriamine, tetramethyl-diaminoethyl ether, bis-(dimethylaminopropyl)-urea, dimethylpiperazine, 1,2-dimethyl-imidazole or 1-aza-bicyclo-(3.3.0)-octane, and particularly alkanolamine compounds also, such as triethanolamine, triisopropylamine, N-methyl- and N-ethyldiethanolamine, and preferably 1.4-diazabicyclo-(2.2.2)-octane and mixtures thereof with the aforementioned basic amines.

Organic compounds of metals are also suitable, preferably organic tin compounds such as tin(II) salts of organic carboxylic acids and dialkyltin(IV) salts of organic carboxylic acids. Organic compounds of metals may be used on their own, but are preferably used in combination with the aforementioned strongly basic amines.

e) For the production of mouldings, a mixture of carbodiimide or carbodiimides and a lactone or lactone derivatives is used as a stabilising agent which considerably delays the ageing phenomena of the PUR moulding which are caused by hydrolysis The carbodiimide of diisopropylphenyl isocyanate (STABAXOL I manufactured by Rheinchemie) has proved to be particularly useful, but other carbodiimides which are reaction products of monofunctional isocyanates, as well as polymeric carbodiimides which are reaction products of difunctional isocyanates and isocyanates of higher functionality, also exhibit the property according to the invention.

Suitable lactone derivatives include γ-valerolactone, γ-decalactone, δ-decalactone and δ-dodecalactone, particularly ε-caprolactone and especially γ-butyrolactone, as well as mixtures of said lactones. The proportions of the mixture according to the invention in the PUR reaction mass amount to 0.5 to 20% by weight of the lactone component and 0.2 to 4.0% by weight of the carbodiimide component, 0.8 to 10% by weight of the lactone component and 0.5 to 2.5% by weight of the carbodiimide component.

f) Auxiliary agents and additives (f) may optionally also be used in conjunction for the production of the mouldings according to the invention.

Examples of auxiliary agents and additives include foaming and blowing agents, surface-active substances, foam stabilisers, cell regulators, parting agents, fillers, colorants, pigments and anti-static agents, as well as substances with a fungistatic or bacteriostatic effect.

Water, which reacts with the organic, optionally modified polyisocyanates (a) with the formation of carbon dioxide and urea groups, is preferably used as a foaming and blowing agent. The water is usually employed in the PUR reaction mass in added amounts of 0.03 to 3% by weight, preferably 0.05 to 1,5% by weight. Low-boiling liquids, which volatilise under the effect of the exothermic polyaddition reaction and which preferably have a boiling point under normal pressure within the range of −40 to 100° C., preferably 0 to 60° C., can also optionally be used instead of or preferably in combination with water, or gases may also be used.

The liquids and gases of the aforementioned type which are suitable as foaming agents may be selected, for example, from the group comprising alkanes, dialkyl ethers, dialkylene ethers, ketones, carboxylic acid esters, fluoroalkanes, and chlorofluoroalkanes, and can also be selected from the inert gases, nitrogen and carbon dioxide. More detailed information on the other aforementioned customary auxiliary agents and additives can be found in the technical literature, for example in the Kunststoffhandbuch, Polyurethanes, Volume VII, Carl-Hanser-Verlag, Munich, Vienna, 1st, 2nd and 3rd Editions 1966, 1983 and 1994.

For the production of mouldings, the organic, optionally modified polyisocyanates (a), higher molecular weight polyhydroxyl compounds (b) and optionally low molecular weight chain extenders and/or crosslinking agents (c) are reacted in amounts such that the equivalent ratio of the NCO groups of polyisocyanates (a) to the sum of the reactive hydrogen atoms of the remaining components is from 1:0.3 to 1:2, preferably 1:0.4 to 1:1.7, particularly 1:0.9 to 1:1.1.

The mouldings can be produced by known methods, such as by the prepolymer or semiprepolymer method or by the one-shot method, with the aid of a high-pressure technique or preferably with the aid of a low-pressure technique. The production of mouldings is advisedly effected in closed forming tools which can be heated under controlled conditions, e.g. metal forming tools, for example those made of aluminium, cast iron or steel, or in forming tools made of fibre-reinforced polyester or epoxy resin moulding compositions. Low-viscosity formulations which flow well and which can therefore be processed more readily can also be processed to form mouldings by means of the reaction injection moulding technique (RIM technique).

This procedures are described, for example, by Dr. H. Piechota and Dr. H. Röhr in "Integralschaumstoffe", Carl-Hanser-Verlag, Munich, Vienna, 1975; by D. J. Prepelka and J. L. Wharton in the Journal of Cellular Plastics, March/April 1975, pages 87 to 98, by U. Knipp in the Journal of Cellular Plastics, March/April 1973, pages 76 to 84, and in the Kunststoffhandbuch, Volume 7, Polyurethanes, 2nd Edition, 1983, pages 333 et seq.

In the process according to the invention, components (a) to (f) are preferably reacted in closed moulds by the one-shot method. A plurality of reaction components, preferably 2 or 3 components, is preferably used here, wherein polyisocyanate component (a) generally forms one component and the other starting components (b) to (f) form one or more other reaction components.

However, component (e) according to the invention can also be added separately or in combination with component (a), or with (b) or (c), as well as with (f), if the latter is substantially free from water (<0.05% by weight).

It has proved particularly advantageous to employ the two-component method, and to combine components (b) to (f) as component (B), and to use the organic polyisocyanates, modified polyisocyanates or mixtures of said polyisocyanates as component (A).

The starting components are mixed at a temperature of 15 to 100° C., preferably 25 to 55° C., and are introduced into the open or closed forming tool under normal pressure or under elevated pressure. Mixing can be effected mechanically by means of a stirrer or agitator screw or can be effected under high pressure by what is termed the counter-current injection method. The forming tool temperature is advantageously 10 to 140° C., preferably 20 to 80° C.

After a moulding time of 0.5 to 10 minutes, preferably 1 to 6 minutes, mouldings are obtained which have generally hardened sufficiently. These can be demoulded directly or can be overcoated directly afterwards with one or more other PUR reaction masses, so that multi-layer PUR mouldings can often be obtained simply by changing the mould cover.

The amount of reaction mixture according to the invention which is introduced into the forming tool is advantageously calculated so that the polyurethane-based mouldings obtained have an apparent density of 150 to 1400 kg/m$^3$ at a hardness of 20 to 90 Shore A, preferably 200 to 700 kg/m$^3$ at 30 to 80 Shore A, and also of 900 to 1250 kg/m$^3$ at 50 to 80 Shore A.

Polyurethane plastics of this type constitute particularly valuable raw materials for commercial articles which are usually subjected to weathering and are exposed to moisture, such as roller and spring elements, and also single and multi-layer constructional variants of shoe soles.

EXAMPLES

Isocyanate-containing prepolymers of the following compositions were used in the examples given below:

1) Prepolymer ($A_1$):
   56.5% by weight 4,4'-MDI
   6.5% by weight of carbodiimide-modified 4,4'-MDI
   37.0% by weight of polyethylene-butylene adipate, OH No. 55
   The resulting NCO content was 19.3%.

2) Prepolymer ($A_2$):
   56.6% by weight 4,4'-MDI
   6.0% by weight of carbodiimide-modified 4,4'-MDI
   37.4% by weight of a polyoxypropylene-oxyethylene block copolyether diol, OH number: 28
   The resulting NCO content was 19.2%.

3) Prepolymer ($A_3$):
   56.3% by weight 4,4'-MDI
   6.2% by weight of carbodiimide-modified 4,4'-MDI
   23.6% by weight of polyethylene-butylene adipate, OH number: 55

13.9% by weight of a polyoxypropylene-oxyethylene block copolyether diol, OH number: 28

The resulting NCO content was 19.0%

The following materials were used as polyol components:
4) polyester polyol ($B_1$), a linear polyethylene-butylene adipate, OH No. 55
5) polyester polyol ($B_2$), a linear polyethylene-butylene adipate, OH No. 37
6) polyether polyol ($B_3$), a linear polyoxypropylene-oxyethylene block copolyether diol, OH No. 28
7) polyether polyol ($B_4$), a polyoxyethylene-oxypropylene block copolyether diol started on trimethylolpropane, OH No. 35

Example 1

Prepolymer ($A_1$) was processed with a mixture ($C_1$), consisting of 91.2% by weight polyol ($B_1$),
1.5% by weight Stabaxol I (manufactured by Rheinchemie),
5.5% by weight 1,4-butanediol and
1.8% by weight diazabicyclooctane.

The temperatures of the materials were each 45° C., and the mixture ratio of component ($C_1$) to ($A_1$) was 100:47.0 parts by weight. Using a low-pressure processing machine, e.g. a PSA 95 machine manufactured by Klöckner Ferromatik Desma GmbH, solid PUR mouldings were obtained, which had reacted completely within 3 minutes and which had a density of 1200 kg/m³ and a hardness of 68 Shore A.

In order to investigate the resistance to ageing by moisture, a tensile test according to DIN 53 504 in general was performed both before and after ageing under humid conditions according to DIN 53 508 in general, i.e. for 7 days at 70° C. and 95% relative atmospheric humidity. The tensile strength decreased from 21.0 MPa to 3.0 MPa.

Example 2

Prepolymer ($A_1$) was processed analogously to example 1 with a mixture ($C_2$), consisting of 86.2% by weight polyol ($B_1$),
1.5% by weight Stabaxol I (Rheinchemie),
5.5% by weight 1,4-butanediol,
5.0% by weight γ-butyrolactone
1.8% by weight diazabicyclooctane.

The mixture ratio of component ($C_2$) to ($A_1$) was 100:46.5. The mechanical test specimen only exhibited a decrease in tensile strength from 20.5 MPa to 12.8 MPa.

Example 3

Prepolymer ($A_2$) was processed with polyol mixture ($C_1$) from example 1 at a mixture ratio of 100 parts ($C_1$) to 48.4 parts ($A_2$). After ageing analogously to example 1, the tensile strength of the solid PUR fell from 12.7 MPa to 1.8 MPa.

Example 4

Prepolymer ($A_2$) was processed with polyol mixture ($C_2$) from example 2 at a mixture ratio of 100 parts ($C_2$) to 48.0 parts ($A_2$). After ageing analogously to example 1, the tensile strength of the solid PUR only fell from 11.8 MPa to 6.8 MPa.

Example 5

Prepolymer ($A_1$) was processed with a mixture ($C_3$), consisting of 81.0% by weight polyol ($B_3$),
12.1% by weight polyol ($B_4$),
1.2% by weight Stabaxol I,
4.3% by weight ethanediol,
1.4% by weight diazabicyclooctane.

The temperatures of the materials were 40° C. for component ($A_1$), and 30° C. for component ($C_3$). The mixture ratio of component ($C_3$) to ($A_1$) was 100:41 parts by weight.

The tensile strength of the resulting solid PUR was 12.4 MPa, and after ageing analogously to example 1 was 3.2 MPa.

Example 6

Prepolymer ($A_1$) was processed, analogously to example 5, with a mixture ($C_4$) consisting of 75.5% by weight polyol ($B_3$),
12.1% by weight polyol ($B_4$),
1.2% by weight Stabaxol I,
4.3% by weight ethanediol
1.4% by weight diazabicyclooctane
5.5% by weight γ-butyrolactone.

The mixture ratio of ($C_4$) to ($A_1$) was 100:40 parts by weight. The tensile strength of the resulting solid PUR was 11.1 MPa, and after ageing analogously to example 1 was 6.1 MPa.

Example 7

Prepolymer ($A_3$) was processed with a mixture ($C_5$), consisting of 91.50% by weight polyol ($B_2$),
1.30% by weight Stabaxol I,
5.75% by weight 1,4-butanediol,
0.35% by weight ethanediol,
1.10% by weight diazabicyclooctane.

The temperatures of the materials were 30° C. for component ($A_3$), and 55° C. for component ($C_5$). The mixture ratio of ($C_5$) to ($A_3$) was 100:43.5. The tensile strength of the resulting solid PUR was 22.4 MPa, but after ageing analogously to example 1 was only 4.1 MPa.

Example 8

Prepolymer ($A_3$) was processed with a mixture ($C_6$), consisting of 85.10% by weight polyol ($B_2$),
1.30% by weight Stabaxol I,
5.75% by weight 1,4-butanediol,
0.35% by weight ethanediol,
6.40% by weight γ-butyrolactone
1.10% by weight diazabicyclooctane.

The temperatures of the materials were 30° C. for component ($A_3$), and 55° C. for component ($C_6$). The mixture ratio of ($C_6$) to ($A_3$) was 100:43.0. The tensile strength of the resulting solid PUR was 21.8 MPa; after ageing analogously to example 1 it was 11.1 MPa.

Example 9

Prepolymer ($A_1$) was processed with a mixture ($C_7$), consisting of 89.00% by weight polyol ($B_1$),
8.65% by weight ethanediol,
0.35% by weight water, 1.20% by weight Stabaxol I, 0.80% by weight diazabicyclooctane.

The temperatures of the materials were 40° C. for component ($A_1$), and 45° C. for component ($C_7$). The mixture ratio of ($C_7$) to ($A_1$) was 100:86 parts by weight. The resulting PUR, which had a free foam density of 310 kg/m$^3$, was processed to form mouldings of density 550 kg/m$^3$. The tensile strength of this foamed PUR material was 8.2 MPa; after ageing analogously to example 1 it was 6.1 MPa.

Example 10

Prepolymer ($A_1$) was processed, analogously to example 9, with a mixture ($C_8$), consisting of 84.30% by weight polyol ($B_1$), 8.65% by weight ethanediol, 0.35% by weight water, 1.20% by weight Stabaxol I, 4.70% by weight γ-butyrolactone, 0.80% by weight diazabicyclooctane.

The mixture ratio of component ($C_8$) to ($A_1$) was 100:87. The resulting PUR, which had a free foam density of 320 kg/m$^3$, was processed to form mouldings of density 550 kg/m$^3$. The tensile strength of this foamed PUR material was 7.9 MPa; after ageing analogously to example 1 it was 7.1 MPa.

What is claimed is:

1. A process for the production of semi-rigid, solid or cellular polyurethane-based mouldings comprising the reaction of
   a) organic and/or modified organic polyisocyanates with
   b) one or more higher molecular weight polyhydroxyl compounds,
   c) one or more chain extenders and/or crosslinking agents, in the presence of
   d) one or more reaction accelerators or catalysts,
   e) an active ingredient mixture comprising a carbodiimide derivative and a lactone derivative, as well as
   f) optionally, other auxiliary agents and additives, wherein component a) and/or b) contains a hydrolytically cleavable ester polyol component, and the addition of the active ingredient combination e) to the reaction mixture results in a content of the selected lactone of 0.5 to 20.0% by weight, and in a content of the selected derivative containing carbodiimide groups of 0.2 to 4.0% by weight.

2. Polyurethane reaction masses comprising
   a) organic and/or modified organic polyisocyanates,
   b) one or more higher molecular weight polyhydroxyl compounds,
   c) one or more chain extenders and/or crosslinking agents,
   d) one or more reaction accelerators or catalysts,
   e) an active ingredient combination comprising a compound containing carbodiimide and a lactone derivative, and
   f) optionally, other auxiliary agents and additives, wherein component a) and/or b) contains a hydrolytically cleavable ester polyol component, and component e) is added to the reaction mixture in a quantity such that it contains from 0.5 to 20.0% by weight of the selected lactone and from 0.2 to 4.0% by weight of the selected derivative containing carbodiimide groups.

3. Mouldings produced according to claim 1, wherein component e) comprises the carbodiimide of diisopropylphenyl isocyanate, and γ-butyrolactone.

4. Mouldings produced according to claim 1, wherein component e) comprises the carbodiimide of diisopropylphenyl isocyanate, and ε-caprolactone.

5. Mouldings produced according to claim 1, characterised in that the density thereof is 150 to 1400 kg/m$^3$.

6. The process of claim 1, wherein the additive of the active ingredient combination e) to the reaction mixture results in a content of the selected lactone of 0.8 to 10.0% by weight, and in a content of the selected derivative containing carbodiimide groups of 0.5 to 2.5% by weight.

* * * * *